United States Patent [19]
Spalding et al.

[11] Patent Number: 6,160,251
[45] Date of Patent: Dec. 12, 2000

[54] METHOD AND APPARATUS FOR DISTINGUISHING ACTUAL SPARSE EVENTS FROM SPARSE EVENT FALSE ALARMS

[75] Inventors: Richard E. Spalding; Carter L. Grotbeck, both of Albuquerque, N. Mex.

[73] Assignee: Sandia Corporation, Albuquerque, N. Mex.

[21] Appl. No.: 09/092,064

[22] Filed: Jun. 5, 1998

[51] Int. Cl.[7] .................................................. H01J 40/14
[52] U.S. Cl. ...................................... 250/214 R; 250/216
[58] Field of Search ............................. 250/208.1, 208.2, 250/216, 214.1, 214 R

[56]  References Cited

U.S. PATENT DOCUMENTS 5,880,838  3/1999  Marx et al. ........................ 250/237 G

OTHER PUBLICATIONS

Eustace L. Dereniak, Devon G. Crowe, *Optical Radiation Detectors*, Introduction to Detector Physics and Nomenclature, John Wiley and Sons, pp. 36–59, 1984.

Douglas Isbell and William A. Steigerwald, *Polar Spacecraft Images Support Theory of Interplanetary Snowballs Spraying Earth's Upper Atmosphere*, ftp.hq.nasa.gov/pub/pao/pressrel/2997/97–112, May 1997.

*Primary Examiner*—John R. Lee
*Attorney, Agent, or Firm*—Russell D. Elliott

[57] ABSTRACT

Remote sensing method and apparatus wherein sparse optical events are distinguished from false events. "Ghost" images of actual optical phenomena are generated using an optical beam splitter and optics configured to direct split beams to a single sensor or segmented sensor. True optical signals are distinguished from false signals or noise based on whether the ghost image is presence or absent. The invention obviates the need for dual sensor systems to effect a false target detection capability, thus significantly reducing system complexity and cost.

18 Claims, 1 Drawing Sheet

METHOD AND APPARATUS FOR DISTINGUISHING ACTUAL SPARSE EVENTS FROM SPARSE EVENT FALSE ALARMS

This invention was made with support from the United States Government under Contract DE-AC04-94AL85000 awarded by the U.S. Department of Energy. The Government has certain rights in this invention.

FIELD OF THE INVENTION

The present invention pertains to the field of remote sensing of sparse events in an environment wherein the signal to noise ratio is low. More specifically, the invention is directed to a method and apparatus for detecting optical signals related to sparse events and distinguishing those signals from noise that may otherwise be confusingly similar to signals associated with actual events. In particular, the present invention is directed to a method and apparatus that use optical signal splitting, offset recombination and creation of a ghost image to allow for reliable differentiation of true signals representing events such as physical motion, explosions and astronomical phenomena from a variety of confusingly similar signals that do not represent actual events being monitored.

BACKGROUND OF THE INVENTION

A variety of monitoring applications both in government and industry involve remote sensing of optical phenomena. Remote sensors, for example, are used in connection with facilities security, weapons monitoring and astronomical studies. Remote sensing often employs the use of optical sensors similar to those in a television camera to detect optical phenomena such as movement or light emission. The camera generates electrical signal outputs that can then be manipulated and interpreted using well-known technologies ranging from oscilloscopes to digital pixel-based video monitors and computers.

Because of the remote nature of this sensing technology, the optical signals associated with the events being monitored are often weak and difficult to distinguish over background signals. The problem of detection of weak signals is aggravated where monitored events occur infrequently and signal to noise ratio is low. When monitoring a sparse-event scene for transient events with an optical sensor, many different types of false events can create signals that look identical to expected target signals, making the detection problem untenable. Accurate detection of true signals associated with monitored events and, where necessary, avoidance of false alarms due to detection of false signals or noise, requires the ability to reliably differentiate true signals from other true-signal-emulating events.

Noise that can cause confusion in analysis of signal data may be associated with either the detecting apparatus or the environment in which detection takes place. Noise, for example, can result in generation of electrical artifacts that may mistakenly be interpreted by a detection system to represent real events of the type being monitored. Common noise sources are well known and understood by individuals skilled in the art of optical radiation detection, and they include photon noise, Johnson noise, shot noise, generation/recombination, 1/f noise, temperature noise, microphonics and postdetector electronic noise. These noise sources are described in detail in E. L. Dreniak and D. G. Crowe, Optical Radiation Detectors, © 1984 John Wiley and Sons, Inc., pp. 36–59, which is herein incorporated by reference in its entirety.

An example of a detection scenario in which there exists controversy over whether apparent signals are in fact real is in the field of astrophysics. Studies by a research team led by Dr. Louis A. Frank of the University of Iowa have postulated the existence of thousands of small ice-containing comets constantly bombarding the Earth resulting in tons of water entering the Earth's atmosphere on a daily basis. This theory is based on image data collected from NASA's Polar Visible Imaging System. (See: NASA Press Release 97–112, May 28, 1997.) Disagreement exists in the scientific community over what the data suggest, or even if the data represent actual optical phenomena. Being able to prove whether the signals being interpreted were the result of actual optical phenomena, and not a consequence of noise that is unrelated to monitored physical events, could resolve much of the current controversy.

Some existing technology directed to distinguishing real event signals from false event signals has centered on multiple detection methodologies. In theory, if more than one detector registers a response to a presumed event, the likelihood that it is not real is significantly reduced. It is very unlikely that two or more identical artifacts will occur at the same moment in separate detectors.

Although the theory of multiple detection is sound, in practice, it is difficult to implement. Use of two or more separate focal planes, for example, in focal plane arrays, requires assurance 1) that the separate detectors are, indeed, monitoring the same target, and 2) that signal arrival is either simultaneous or computationally manipulated so as to be legitimately interpreted as simultaneous. The issues can result in a mapping problem that is at best expensive to solve, and at worst is intractable.

SUMMARY OF THE INVENTION

Therefore, it is an object of the present invention to provide a method and apparatus capable of distinguishing true optical signals from noise.

It is another object of the present invention to provide a method and apparatus that function by splitting a single optical signal and directing the portions of the signal via separate paths to the same sensor.

It is another object of the invention to generate a "ghost image" in the case of actual detected events which would not be present for false events.

It is yet another object of the invention to provide a remote sensing apparatus that incorporates a monolithic optical element which is mechanically stable.

It is yet another object of the invention to provide a sparse optical event detector comprising an optical beam splitter, a first optical path through which a first component beam of an incident beam split by the beam splitter passes, a second optical path through which a second component beam of an incident beam split by the beam splitter passes, and an optical sensor positioned so that it senses both the first component beam and the second component beam.

Another object of the invention is to provide a method for verifying that perceived signals are the result of actual optical events comprising the steps of providing an optical sensor, providing optical elements that collect light comprising a beam, split the beam into at least two beam components, and direct the at least two beam components to the sensor along separate optical paths, whereby the at least two beam components strike the optical sensor in different locations on the sensor causing at least two similar images to be detected by the sensor, sensing signals including signals that result from actual optical events, and distinguishing signals that result from actual optical events, which signals cause the at least two similar images to be detected by the sensor, from other signals that do not result from actual optical events, which other signals do not cause the at least two similar images to be detected by the sensor.

Another object of the invention is to provide a sparse optical event detector comprising a collector positioned to collect incident light comprising an incident beam, a first optical beam splitter positioned so as to split the incident beam into a first component beam and a second component beam, a first optical path through which the first component beam passes, a second optical path, through which the second component beam passes, a second beam splitter positioned so as to split the first component beam into first and second subcomponent beams, and an optical sensor positioned so that it senses both the first subcomponent beam and the second subcomponent beam.

These and other objects of the present invention are fulfilled by providing a method and apparatus for distinguishing false signals from actual optical signals using optical elements to split an incident beam of light into more than one component, and directing the component parts of the beam via different paths to a single sensor or segmented sensor. In this way, a ghost image is generated, and detected by the sensor, so that true optical phenomena can be recognized as distinct from other signal generating phenomena such as noise in a low signal to noise ratio remote sensing environment.

Further scope of the applicability of the present invention will become apparent from the detailed description given below. However, it should be understood that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description and the accompanying drawing, which is given by way of illustration only, and thus is not limitative of the present invention, and wherein.

DETAILED DESCRIPTION OF THE PREFERRED EMBODIMENT

Figure 1:
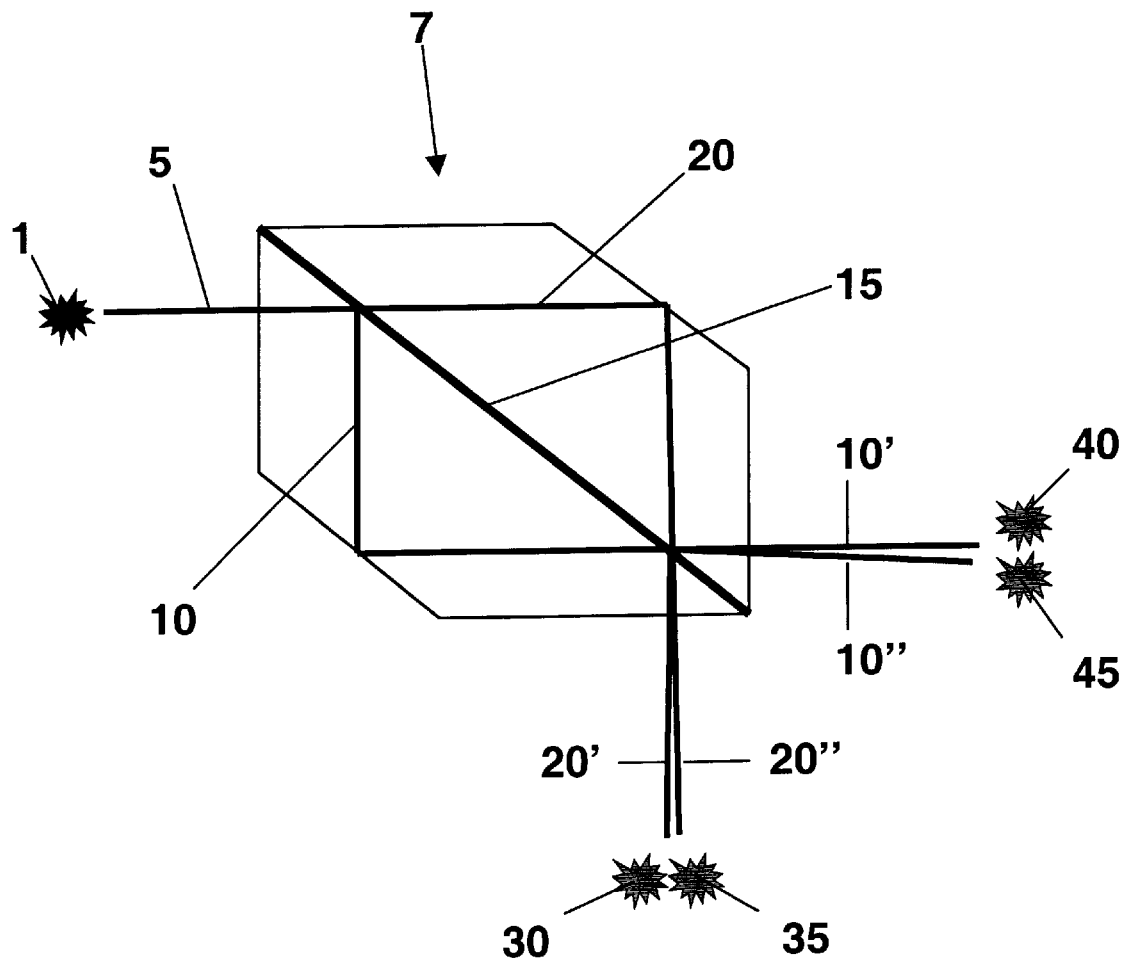
FIG. 1 is a schematic illustration showing optical elements capable of accomplishing some of the objectives of the invention.

The present invention incorporates the principle of splitting a beam of light emitted or reflected by a real entity. The separated elements of the beam of light are then directed along separate paths and are ultimately projected onto a single sensor (which may, according to a given application be a segmented sensor). As a consequence of their separate paths, however, they do not reach the sensor from precisely the same angle. The result is two separate images being created from a single optical signal-generating event.

The benefit associated with using a single sensor is that the mapping and coordination problems mentioned above are eliminated. Additionally, since a single sensing instrumentality is used, the amount of optics needed and system data to be analyzed is effectively halved compared with prior art systems using, for example, two separate detectors. Finally, since a single optical instrument (capable of monolithic manufacture) is substituted for separate optical systems, enhanced durability, increased efficiency and reduced cost can be realized versus prior art technology.

Beam splitting has been used in the field of interferometry, but in a different way from how it is used in the context of the present invention. In an interferometer, the separate components of a split beam are reunited so as to display interference patterns resulting from superposition of waves having similar frequency. An interferometer can be used to interpret interference patterns for a variety of purposes, including distance calculation and other measurements. The present invention is unlike an interferometer because, although the original beam is split, the component parts of the incident beam are not thereafter used to generate wave interference. Rather, they follow separate paths in order to create separate overlapping (or offset) images.

The effect of creating a second, or "ghost", image is to permit differentiation of true signals caused by actual optical phenomena from false signals that emulate optical phenomena but are generated by artifacts of the detection system or other noise-creating occurrences. Absent a true optical source causing an actual beam of light to enter a detector configured according to the principles of this invention, there will be no light beam to split and direct along divergent optical paths and, ultimately, there will be no ghost image generated. The requirement that any valid signal have a ghost signal of predetermined location and characteristics appearing on the sensor eliminates the vast majority of false alarms one might encounter in a typical monitoring environment.

In the discussion that follows, an embodiment is shown that is an illustrative example of how the objects of the invention can be accomplished. It should be noted, however, that a satisfactory instrument falling within the scope of the claimed invention could be made using a wide variety of different optical configurations. At a minimum, such an instrument must split an incident beam at least once and cause separate component parts of the incident beam ultimately to be directed to a single sensor or segmented sensor thereby resulting in creation of at least two images from the single incident beam.

Referring to FIG. 1, a schematic of the optical elements of an apparatus constructed according to the principles of the invention is shown. For purposes of this illustration, consider a flash 1 to be the optical source generating an incident beam of light 5. According to this embodiment, the incident beam of light 5 enters an optical device 7 including a beam splitter 15. The beam splitter 15 splits the incident beam of light 5 into two primary component parts, a first split beam component 10 and a second split beam component 20. The beam splitter can either split the beam into two components of equal intensity (using a 50:50 beam splitter), or it may be desirable depending on the requirements of a given application to split the beam into two components of unequal intensity. A 54:46 beam splitter was used, for example, in one of the demonstrations of the principles of this invention, and this resulted in one of the separate beam components being slightly brighter than the other. This, in turn, had the effect of boosting the intensity of the images ultimately generated by that beam component, relative to the other beam component.

Referring again to the FIGURE, the two separate beam components, 10 and 20, follow different optical paths within the optical device 7 reflecting off of various reflective surfaces. In the embodiment shown in FIG. 1 the two beam components 10 and 20 then pass a second time through the beam splitter 15 causing two pairs of secondary component beams 10' and 10", and 20' and 20" to be created. Each pair (10'/10" and 20'/20") of secondary component beams then exits the optical device 7 from nearly the same location. The pairs, however, exit the optical device 7 in generally different directions due to the different directions from which the primary beam components 10 and 20 approached the beam splitter prior to exit. For this embodiment, secondary component beam pair 10' and 10" are disregarded. Secondary component beams 20' and 20" exit the optical device 7 at slightly different angles from the beam splitter 15, and hence they travel along slightly divergent paths. They are then sensed by an optical sensor (not shown in the FIGURE). Due to their slightly different angles relative to the beam splitter 15, the two secondary component beams 10' and 20' cause two slightly offset images, 30 and 35 to appear to the sensor.

It may be desirable, for example, as a confirmation measure, not to disregard the remaining secondary component beam pair 10' and 10". As illustrated in the FIGURE, a second pair of offset images 40 and 45 results from that beam pair in a fashion similar to images 30 and 35, and it may be of benefit in a given application to sense both pairs of offset images and compare them.

As mentioned above, the embodiment shown in the FIGURE illustrates but one example of how optical components may be configured to accomplish the ends of the invention. Other configurations will function satisfactorily, and will be within the understanding of those skilled in the art of optical devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for verifying that perceived signals are the result of actual optical events comprising the steps of:

providing an optical sensor providing optical elements that
collect light comprising a beam,
split the beam into at least two beam components, and
direct the at least two beam components to the sensor along separate optical paths,
whereby the at least two beam components strike the optical sensor in different locations on the sensor causing at least two similar images to be detected by the sensor, sensing signals including signals that result from actual optical events, and distinguishing signals that result from actual optical events, which signals cause the at least two similar images to be detected by the sensor, from other signals that do not result from actual optical events, which other signals do not cause the at least two similar images to be detected by the sensor.

2. The method of claim 1 wherein the at least two beam components strike the optical sensor from different angles and the at least two similar images detected by the sensor are offset from one another.

3. A sparse optical event detector comprising:

an optical beam splitter, a first optical path through which a first component beam of an incident beam split by the beam splitter passes, a second optical path through which a second component beam of an incident beam split by the beam splitter passes, an optical sensor positioned so that it senses the first component beam and the second component beam; and means for distinguishing the signal from the incident beam from other signals not from the incident beam.

4. The sparse optical event detector of claim 3 wherein the first component beam and the second component beam strike the optical sensor from different angles.

5. The sparse event detector of claim 4 wherein the first component beam causes a first image to be detected by the sensor and the second component beam causes a second image to be detected by the sensor.

6. The sparse event detector of claim 5 wherein the first image and the second image are detected by the sensor as offset from one another.

7. A sparse optical event detector comprising:

a collector positioned to collect incident light comprising an incident beam, a first optical beam splitter positioned so as to split the incident beam into a first component beam and a second component beam, a first optical path through which the first component beam passes, a second optical path through which the second component beam passes, a second beam splitter positioned so as to split the first component beam into first and second subcomponent beams, an optical sensor positioned so that it senses both the first subcomponent beam and the second subcomponent beam, and means for distinguishing the signal from the incident beam from other signals not from the incident beam.

8. The sparse optical event detector of claim 7 wherein the first subcomponent beam and the second subcomponent beam strike the optical sensor from different angles.

9. The sparse event detector of claim 8 wherein the first subcomponent beam causes a first image to be detected by the sensor and the second subcomponent beam causes a second image to be detected by the sensor.

10. The sparse event detector of claim 9 wherein the first image and the second image are detected by the sensor as offset from one another.

11. The sparse event detector of claim 7 wherein the first optical beam splitter and the second optical beam splitter are coextensive.

12. The sparse event detector of claim 8 wherein the first optical beam splitter and the second optical beam splitter are coextensive.

13. The sparse event detector of claim 9 wherein the first optical beam splitter and the second optical beam splitter are coextensive.

14. The sparse event detector of claim 10 wherein the first optical beam splitter and the second optical beam splitter are coextensive.

15. The sparse event detector or claim 11 wherein the coextensive first a nd second optical beam splitters are selected from the group consisting of 50:50 beam splitters and beam splitters that split beams in ratios other than 50:50.

16. The sparse event detector or claim 12 wherein the coextensive first and second optical beam splitters are selected from the group consisting of 50:50 beam splitters and beam splitters that split beams in ratios other than 50:50.

17. The sparse event detector or claim 13 wherein the coextensive first and second optical beam splitters are selected from the group consisting of 50:50 beam splitters and beam splitters that split beams in ratios other than 50:50.

18. The sparse event detector or claim 14 wherein the coextensive first and second optical beam splitters are selected from the group consisting of 50:50 beam splitters and beam splitters that split beams in ratios other than 50:50.

* * * * *